United States Statutory Invention Registration [19]

[11] Reg. Number: H510

Clinch [43] Published: Aug. 2, 1988

[54] AUTOMATIC AUTHENTICATION FOR VOICE TRANSMISSIONS

[75] Inventor: Marvin R. Clinch, Oneida, N.Y.

[73] Assignee: The United States of America as represented by the Secretary of the Air Force, Washington, D.C.

[21] Appl. No.: 469,373

[22] Filed: Feb. 24, 1983

[51] Int. Cl.[4] ..... G07D 7/00; G06F 7/04; H04K 1/00; H04L 9/02

[52] U.S. Cl. ..... 340/825.34; 340/825.31; 380/23; 380/43

[58] Field of Search ..... 340/825.3–825.4, 340/825.44, 825.48; 178/22.08, 22.09, 22.01, 22.02, 22.13; 179/1.5 R, 1.5 FS, 1.5 E; 375/2.1

[56] References Cited

U.S. PATENT DOCUMENTS

| | | | |
|---|---|---|---|
| 4,281,215 | 7/1981 | Atalla | 178/22.08 |
| 4,315,101 | 2/1982 | Atalla | 178/22.08 |
| 4,349,695 | 9/1982 | Morgan et al. | 178/22.08 |
| 4,388,643 | 6/1983 | Aminetzah | 178/22.08 |

*Primary Examiner*—Stephen C. Buczinski

*Assistant Examiner*—Linda J. Wallace

*Attorney, Agent, or Firm*—William Stepanishen; Donald J. Singer

[57] ABSTRACT

An automatic authentication apparatus utilizing a random code generator to provide a challenge signal for transmission to a remote station. The challenge code also being converted to a response code at the sending station and stored therein. The receiving station generating a response signal to the challenge signal and transmitting the response signal to the sending station. The sending station comparing the two response signals to determine that communications with a friendly station has been established.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATIC AUTHENTICATION FOR VOICE TRANSMISSIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to voice transmission systems and in particular to an automatic authentication apparatus for a voice transmission system.

It has been shown by the experience gained in Viet Nam and earlier that intrusions into voice communications circuits by unfriendly parties was largely successful because of the inability or unwillingness of our troops to use authentication procedures to identify the caller on those voice circuits.

The process of authentication is used to assure a receiver station that the calling party is providing legitimate information or orders. If two stations, A and B are involved in a communication net, the sequence of events is as follows: Station A calls Station B to transmit an order. Station B cannot immediately identify the caller or the calling station A by any means that is independent of the content of the communication. Therefore, station B requests that station A provide a prearranged response to a challenge that he gives. For example, station A calls station B. Station B, unsure of the identity of the caller requests "Authenticate Delta Foxtrot" knowing that a particular response should be made. Station A responds with "I authenticate Golf Hotel" which is the correct response, and is recognized by station B, and the communication is then started. If any other response is given, station B refuses to conduct communications.

The present invention solves the problem of intrusion into military communications by enemy forces. The bogus use of call signs of our stations by enemy troops is well known. Only another identification means will improve the credibility of the station identification. This intrusion can be prevented by the conventionally performed authentication procedures when used. However, battlefield experience has shown that the conventional authentication procedures now used require the radio operator (communicator) to carry paper lists of challenge/response letters or words. If lost or captured, these lists may be used by enemy operators to intrude on the communication. In order that the physical size of the documents be small enough to carry, the contents would have to be kept few in number. To circumvent the need for large lists, the use of the code is varied periodically by changing a "key". With the conventional authentication procedures, the communicator must: a, have the lists readily available; b, remember the key for each use of the list; and c, be able to search through the list to find the proper challenge/response combination. In the dark this would require available light, which in itself could be fatal.

Since the unit described herein would be fully self-contained and semiautomatic in its use; no paper lists would be required, and operation would be performed by the press of a button on the communication set. The key could also be changed rapidly, even during the course of a conversation, and thus prevent the use of recorded intrusion.

This invention is one in which a small unit is attached to each of the transceivers in use. Only two connections are made to the transceiver, an input in parallel with the microphone circuit and an output from the audio output circuit. Instead of the operators being required to carry and read prepared authentication books or sheets, the unit would generate a set of audio tones in digital form which would be transmitted, received and decoded. The responding station unit would generate the "correct" response set of tones which are transmitted to the first station. The first station unit then decodes the received response and compares it with the expected response. If the response matches the expected response then an indication is given that the calling station is truly friendly.

The method of generating these codes and their appropriate responses is proposed to be changeable by means of manually entered "keys" which may be easily changed periodically to prevent intrusion by enemies who may have "broken" the key and might have captured an authentication unit. Therefore, it may be seen that the present invention encompasses the concept of a semiautomatic authentication unit which could be attached to voice transceivers to provide an easily used, reasonably rapid and intrusion-resistant authentication capability.

SUMMARY OF THE INVENTION

The present invention utilizes a random code generator unit at the sending radio station to generate a set of audio tones in digital form which form a part of the transmission to the receiving radio station. The digital code is entered into a memory unit at the sending radio station. The digital code portion of the transmission is decoded at the receiving radio station. The receiving radio station generates the correct digital code response which is converted to a set of tones that are transmitted to the first sending ratio station. The authentication process is accomplished by decoding the received response and comparing it with the expected response to the transmitted code which is also stored in memory unit at the sending radio station. Once it has been established that the proper response has been received, the communications between stations will commence.

It is one object of the present invention, therefore, to provide an improved automatic authentication apparatus for voice transmission.

It is another object of the invention to provide an improved automatic authentication apparatus wherein rapid semiautomatic introduction of digital authentication signals are introduced rapidly and semiautomatically into voice communication circuits.

It is still another object of this invention to provide an improved automatic authentication apparatus wherein the operator may rapidly change the key to the authentication code by manual entry into the encoding/decoding device.

It is yet another object of this invention to provide an improved automatic authentication apparatus wherein existing communication channels may be utilized without any modification of equipment related to these channels.

It is a further object of this invention to provide an improved automatic authentication apparatus wherein the changing of the authentication codes on a rapid basis, reduces or eliminates the use of captured equipment by enemy forces.

It is an even further object of this invention to provide an improved automatic authentication apparatus which is suitable for non-voice bauded but unencrypted signal channels.

It is yet a further object of this invention to provide an improved automatic authentication apparatus wherein the received digital authentication signal is automatically compared with the expected, correct response.

It is a still further object of this invention to provide an improved automatic authentication apparatus wherein the digital authentication code that is generated by the initiating station is truly random and thus any unauthorized potential intruder has no way to predict the original transmission of his response.

It is still a further object of this invention to provide an improved automatic authentication apparatus wherein the authentication process will be independent of transmission mode, whether radio, telephone line, or voice quality circuits using fibreoptic transmission lines.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
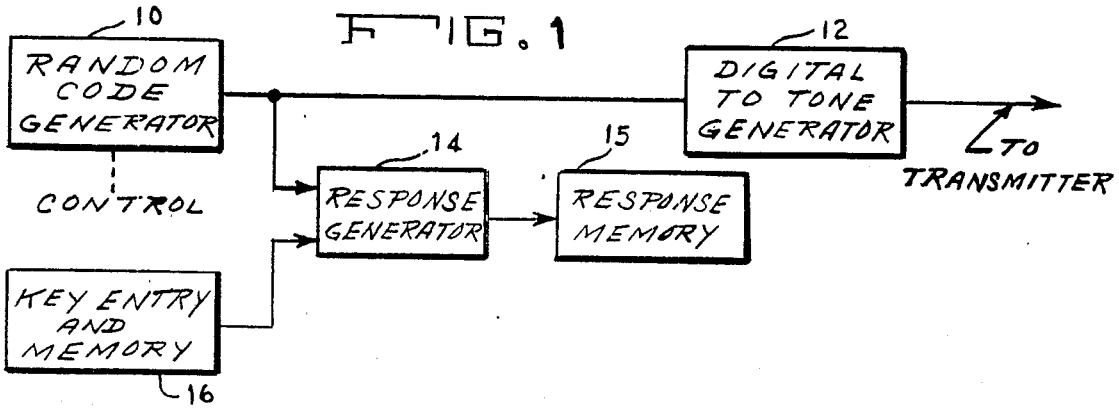
FIG. 1 is a block diagram of the code generating portion of the automatic authentication apparatus at the sending station.

Referring now to FIG. 1, there is shown a block diagram of the sending station's code generating portion of the automatic authentication apparatus. The random code generator unit 10 is utilized to generate a random code by the radio operator at station A. The random code is simultaneously applied to digital to tone generator unit 12 and response generator unit 14. The audio signal output from the digital to tone generator unit 12 is applied to a transmitter unit (not shown) for transmission. The response generator unit 14 receives the output signal from the key entry and memory unit 16. The output from the response generator unit 14 is applied to the response memory unit 15.

Figure 5:
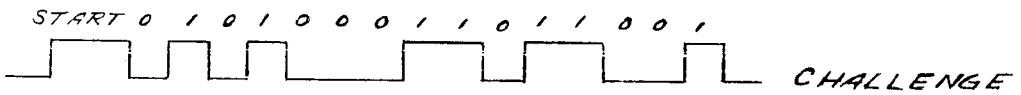
FIGS. 5 and 6 are graphical representations of a typical challenge and response signal that may be utilized by the present apparatus.

The code generating portion of the automatic authentication apparatus operates in the following manner. The operator of the radio at station A by means of a control input to the random code generator unit 10 starts the first mode of the authentication process, which is called the challenge mode, by the generation of a random binary code of suitable format. An example of a suitable code format may be a code that is similar to the Baudot code with a start or synchronizing pulse of appreciably greater duration than the remaining pulses. The remainder of the succeeding pulses will be of shorter duration than the first, and will all be of equal duration as shown in FIG. 5. The number of pulses and the rate of pulses to be generated may be optimized with respect to the communications bandwidth available, the time available for the authentication process, and the conditions of interference likely on the channel. The binary code thus generated is then fed to the digital to tone converter unit 12 which converts the binary digital pulses to corresponding audio frequency tones, e.g., the binary 1 or "mark" signal would generate an audio frequency tone whereas the binary 0 or "space" would cause a different frequency audio tone to be generated. While discrete component digital to tone generators are well known in the art, there are integrated digital to tone generators available within the present state of the art. Thus, the two tones which are generated in the digital to tone converter unit 12 are then applied to the audio input circuit of a communications transceiver (not shown) in parallel with the microphone to be transmitted therefrom.

The output of the random code generator unit 10 which is fed to the digital to tone converter unit 12 is also simultaneously fed as one input to the response generator unit 14 along with the output of the key entry and memory unit 16. The key entry and memory unit 16 is used in the following manner. The operator of station A by means of a keypad, manually enters a set of digits (called the key) which is then stored in the memory portion of the key entry and memory unit 16. The key which is entered and stored in the key entry and memory unit 16 remains there until it is changed by the entry of another key. It is this key which determines the specific format of the output of the response generator unit 14. The two inputs to the response generator unit 14, one from the random code generator unit 10 and one from the key memory unit 16, are combined in response generator unit 14 by one of the conventional encryption techniques to provide an output which is different from the input from the random code generator unit 10 and cannot be readily "inverted" i.e., the input and key cannot easily be determined by analysis of a set of random code challenges and the response to them. This prevents a potential enemy from discovering the means to generate acceptable responses to the authentication challenges. The output of the response generator unit 14 is stored in the response memory unit 15 for later use in the authentication process (mode 4).

Figure 2:
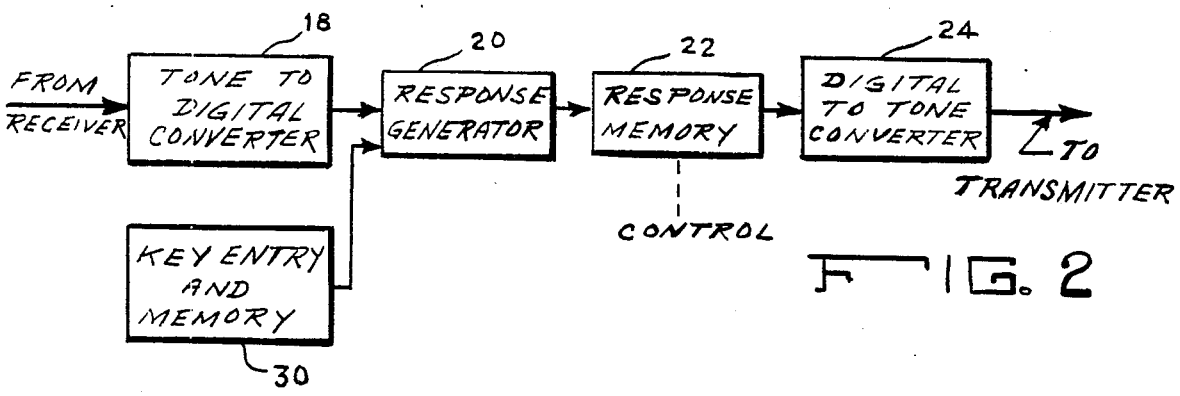
FIG. 2 is a block diagram of the response generating portion of the automatic authentication apparatus at the receiving station.

Turning now to FIG. 2, there is shown a block diagram of the response generating portion of the automatic authentication apparatus. The audio signal output from station A is received at station B and is applied to the tone to digital converter unit 18. The digital code signal from the tone to digital converter unit 18 is applied to the response generator unit 20. The output signal from the response generator unit 20 is applied to the response memory unit 22. The key entry and memory unit 30 provide input signal to the response generator unit 20. The response signal from the response memory unit 22 is applied to the digital to tone converter unit 24 for conversion to an audio signal. The audio signal from the digital to tone converter unit 24 is applied to the transmitter unit (not shown) for transmission to station A.

Figure 6:
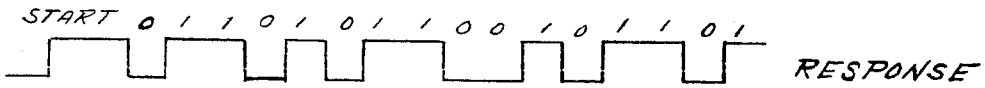

The response portion of the automatic authentication apparatus at station B operates in the following manner. The authentication apparatus at station B is configured for mode 2 to receive the challenge signal which was generated and transmitted by station A. The receiver (not shown) at station B receives the challenge signal, generates the proper response, and retains the response in memory until station B is ready to transmit. This challenge reception mode is explained as follows. The audio signal from the communication receiver (not shown) is fed to the input of the tone to digital converter unit 18. The audio signal contains the challenge tones which were generated during the challenge mode at station A. The tone to digital converter unit 18 accepts the mark and space tones and converts them to digital binary signals by any suitable conventional means which are well known and available within the state of the art. There is shown in FIG. 6 a graphical representation of the digital response signal which is generated at station B. The first (start) pulse by virtue of its length and polarity is recognized as the synchronizing pulse. The remaining pulses are then recognized as data pulses through the use of suitable and appropriate conventional timing circuitry. The pulses thus determined are then fed to the response generator unit 20, together with the output of the key entry and memory unit 30, the operation of both units having been described earlier. The key stored in the memory unit 30 at station B must be identical to that stored in the key memory unit 16 at station A. This key when processed with the received challenge code by the response generator unit 20 will generate a response signal at station B that is identical to the response signal which was generated at station A and stored in that response memory unit 15. The response signal thus generated at station B is stored in the response memory unit 22 in preparation for the next authentication mode, the response mode.

Still referring to FIG. 2, the response mode, (mode 3) is started after the transmitter (not shown) has been turned on at station B and the receiver is on at station A. The radio operator at station B initiates, through control circuitry, the transfer of the response code which was retained in the response memory unit 22 to the digital to tone converter unit 24. The audio tones which represent the response code are then transmitted by means of the audio input circuitry of the transmitter as described earlier under the challenge mode.

Figure 3:
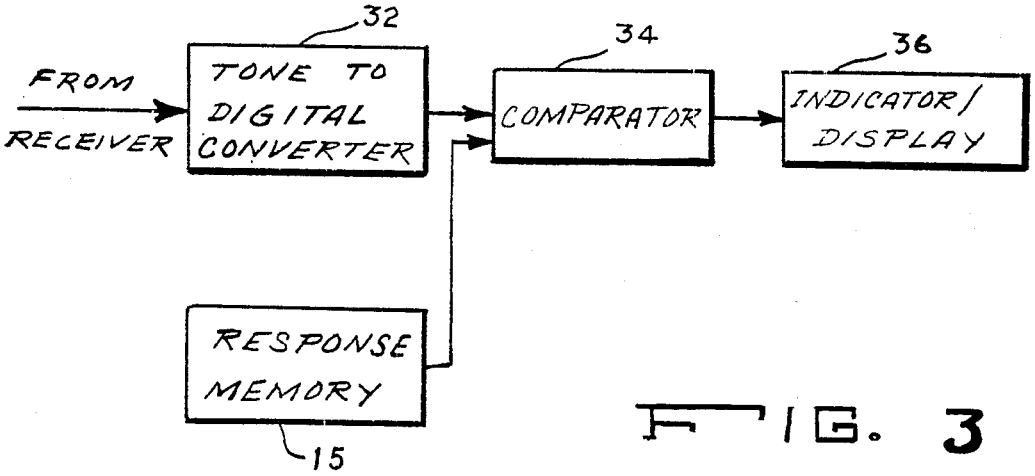
FIG. 3 is a block diagram of the code authentication unit at the sending station.

Referring now to FIG. 3, the last step of the authentication process (mode 4) is therein shown and described. The operator at station A places his equipment in the receive condition. The received tones are fed from the receiver audio output to the input of the tone to digital converter unit 32. The output of the tone to digital converter unit 32 at station A is now a replica of the code stored in the response memory unit 22 of station B. If the authentication process has been correctly conducted the response code which was generated initially by station A in the first mode and stored at station A and the response signal which was generated and transmitted by station B are identical. The remaining step is then to compare the two codes in the comparator unit 34 to confirm that the two response signals are identical. The result of this comparison is fed to the indicator/display unit 36 which notifies the operator that the correct response was received. The operator then may conduct the communications with station B.

Figure 4:
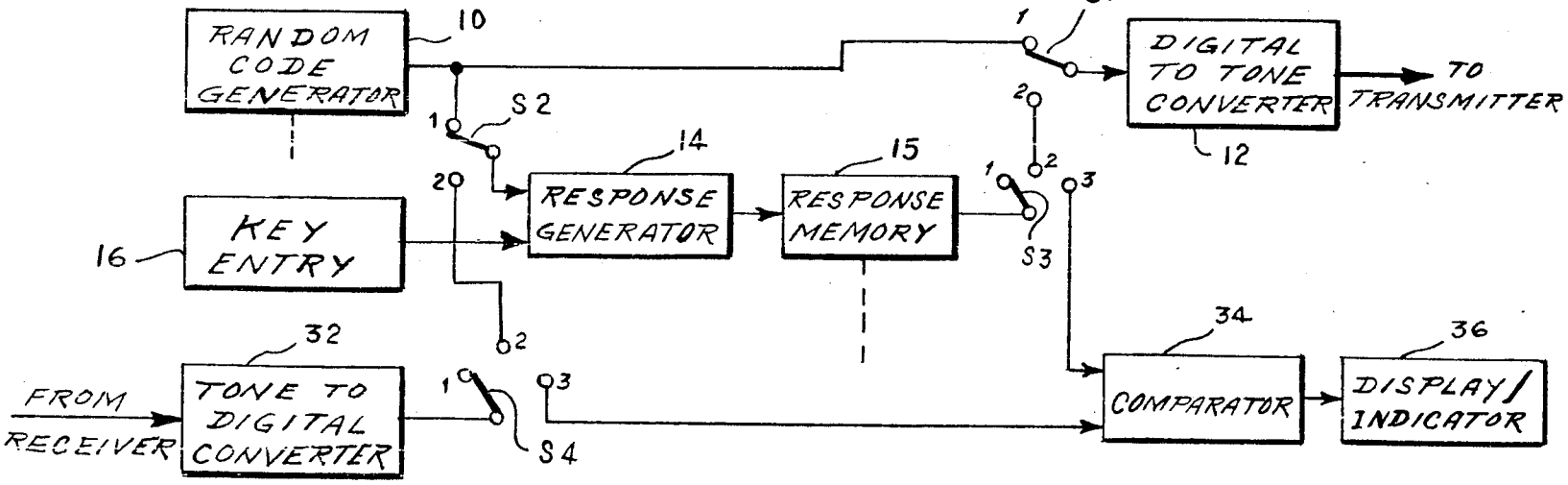
FIG. 4 is a block diagram of a complete automatic authentication apparatus for two stations.

Now referring to FIG. 4, there is shown a complete automatic authentication apparatus that would be utilized by each station in a communications net. The units of the system are the same as those that have been shown and described with respect to FIGS. 1 through 3. However, a number of switches S1 through S3 have been utilized to provide dual utility and versatility to units that are used in more than one circuit configuration. The automatic authentication apparatus comprises a random code generator unit 10 connected by means of switch position one of switch S1 to the digital to tone converter unit 12. The key generator entry unit 16 is connected directly to the response generator unit 14. The random code generator unit 10 is connected by means of switch position one of switch S2 to the response generator unit 14. The response generator unit 14 is directly connected to the response memory unit 15. The tone to digital converter unit 32 is connected by means of switch position 1 of switch S4 to switch position 2 of switch S2 which is connected to the response generator unit 14. The tone to digital converter unit 32 is connected by means of switch position three of switch S4 to the comparator unit 34. The response memory unit 15 is connected by means of switch position 2 of switch S3 through switch position two of switch S1 to the digital to tone converter unit 12 and also by means of switch position three of switch S3 to the comparator unit 34. It should be clear from the drawing that switch positions on the switch units S1 through S4 are mutually exclusive. The comparator unit 34 is directly connected to the display/indicator unit 36. All of the previously described elements of the authentication system embodiment are shown with appropriate switching so that the various components may be used as appropriate for each of the operational modes. Each transceiver would be equipped with the full compliment as shown. The switching is shown schematically while the control functions are omitted for clarity. Such control functions while a part of this invention are not critical in design and may be accomplished in a number of conventional ways, depending on the construction of the unit.

Although the invention has been described with reference to a particular embodiment, it will be understood to those skilled in the art that the invention is capable of a variety of alternative embodiments within the spirit and scope of the appended claims.

What is claimed is:

1. An automatic authentication apparatus comprising in combination:

means for generating a random code, said random code generating means generating a plurality of random codes, said random code generating means randomly providing one random code of said plurality of random codes as a code output signal, means for generating signals receiving said code output signal from said random code generating means, said signal generating means converting said code output signal to an audio code signal, said audio code signal to be transmitted to a remote station, a response generating means receiving said code output signal from said random code generating means, said response generating means providing a code response signal in response to said code output signal, a memory means receiving said code response signal from said response generating means, said memory means storing said code response signal, a signal converting means to receive a challenge response signal from said remote station that is being challenged by said audio code signal, said signal converting means converting said challenge response signal to a response answer signal, and, means for comparing signals receiving said code response signal from said memory means and receiving said response answer signal from said signal converting means, said comparing means comparing said code response signal with said response answer signal, said signal comparing means providing an authentication signal when said code response signal and said response answer signal are identical.

2. An automatic authentication apparatus as described in claim 1 further including a display/indicate means to receive said authentication signal from said comparing means, said display/indicator means providing a visual display that a correct response has been received.

3. An automatic authentication apparatus as described in claim 1 wherein said code output signal comprises a digital code.

4. An automatic authentication apparatus as described in claim 1 wherein said signal generating means comprises a digital to tone generating means.

5. An automatic authentication apparatus as described in claim 1 wherein said signal converting means comprises a tone to digital converting means.

6. An automatic authentication apparatus as described in claim 3 wherein said digital code comprises a Baudot code.

7. An automatic authentication apparatus as described in claim 1 wherein said code response signal is generated as a result of said response generating means which comprises a key entry means, and a means to combine the random code and the key to provide a controlled response.

* * * * *